(12) United States Patent
Yasuda

(10) Patent No.: US 8,306,416 B2
(45) Date of Patent: Nov. 6, 2012

(54) IMAGING APPARATUS

(75) Inventor: Koji Yasuda, Osaka (JP)

(73) Assignee: Panasonic Corporation, Osaka (JP)

( * ) Notice: Subject to any disclaimer, the term of this patent is extended or adjusted under 35 U.S.C. 154(b) by 170 days.

(21) Appl. No.: 12/854,302

(22) Filed: Aug. 11, 2010

(65) Prior Publication Data

US 2011/0044681 A1 Feb. 24, 2011

(30) Foreign Application Priority Data

Aug. 18, 2009 (JP) .................................. 2009-188874

(51) Int. Cl.
*G03B 17/02* (2006.01)
*G03B 15/03* (2006.01)
*H04N 5/225* (2006.01)
(52) U.S. Cl. ........ 396/539; 396/177; 348/371; 348/372; 348/374
(58) Field of Classification Search .................. 396/177, 396/178, 155, 535, 539; 348/371, 373, 374, 348/372
See application file for complete search history.

(56) References Cited

U.S. PATENT DOCUMENTS

| 6,349,178 | B1 | 2/2002 | Taku |
| 6,349,179 | B1 | 2/2002 | Taku |
| 6,442,347 | B1 | 8/2002 | Ito |
| 2005/0174464 | A1 | 8/2005 | Iwase et al. |
| 2007/0053683 | A1 | 3/2007 | Fujikawa |
| 2008/0303924 | A1* | 12/2008 | Hamamura .............. 348/231.99 |
| 2009/0002541 | A1* | 1/2009 | Niwamae ...................... 348/335 |

FOREIGN PATENT DOCUMENTS

| JP | 8-278543 | 10/1996 |
| JP | 9-311414 | 12/1997 |
| JP | 10-254033 | 9/1998 |
| JP | 2001-42399 | 2/2001 |
| JP | 2005-300834 | 10/2005 |
| JP | 2007-72304 | 3/2007 |

* cited by examiner

*Primary Examiner* — Rochelle-Ann J Blackman
(74) *Attorney, Agent, or Firm* — Panasonic Patent Center

(57) ABSTRACT

An imaging apparatus includes a mount to which a lens unit is mountable, an imager operable to generate an image signal from light incident through the lens unit, a light-emitter operable to emit light, and an electric storage device operable to supply electric power to the light-emitter. The electric storage device is disposed behind the mount and below the imager.

6 Claims, 8 Drawing Sheets

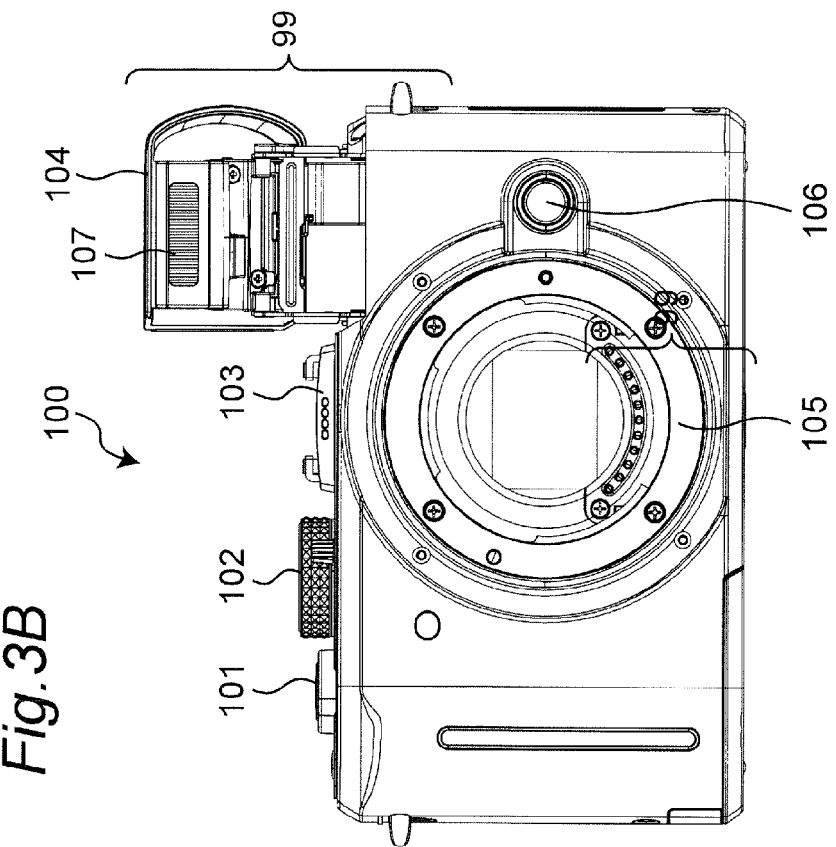
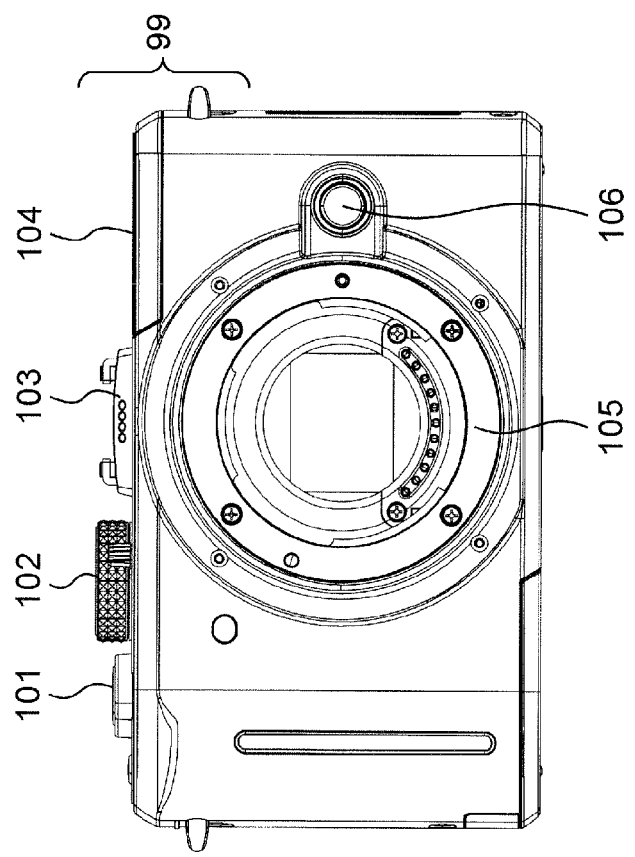
Fig.3B
Fig.3A

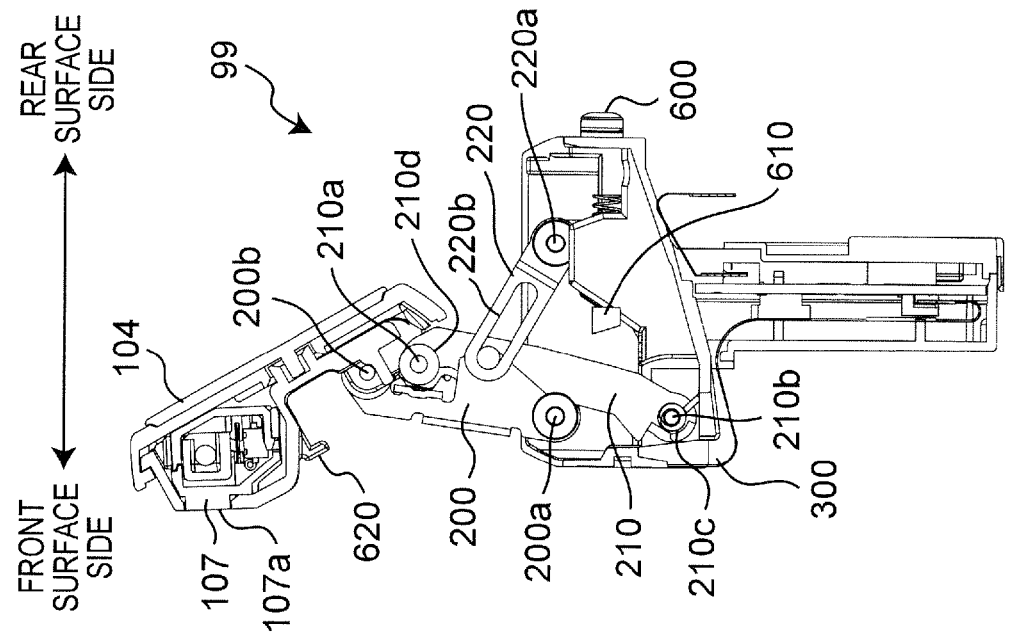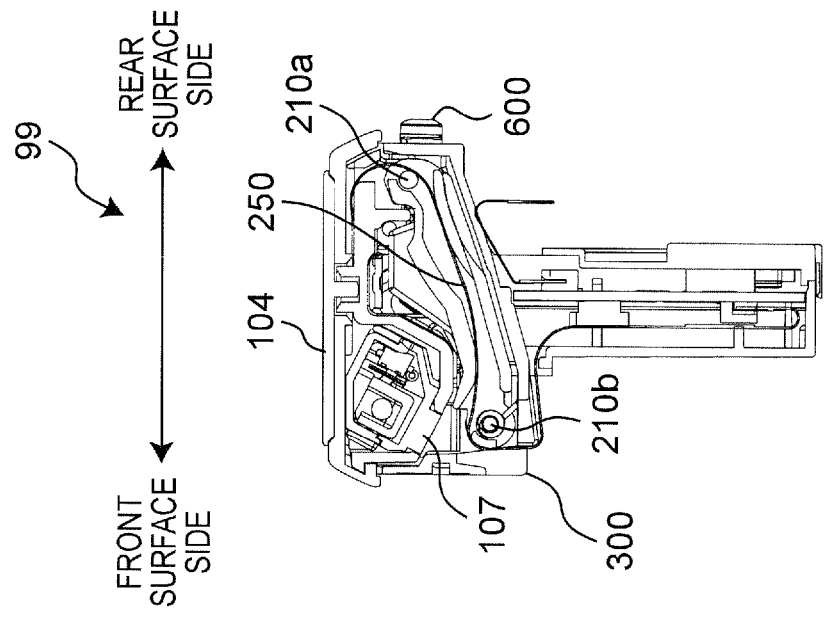

IMAGING APPARATUS

BACKGROUND

1. Technical Field

The technical field relates to an imaging apparatus for a single-lens type camera of which lens is interchangeable.

2. Related Art

Recently a single-lens reflex type digital camera that can take an image whose quality is higher than that of a compact type digital camera becomes widespread.

For example, JP-A-2007-72304 discloses a configuration of a single-lens reflex type digital camera. In a camera body of the single-lens reflex type camera disclosed in JP-A-2007-72304, a lens mount, a mirror chamber, a shutter device, and an imaging sensor (imager) are disposed in this order on an optical axis. The mirror chamber includes a movable mirror that guides light incident through a lens onto an optical viewfinder side through a prism when an image is not taken. When a user presses a release button, the movable mirror turns to be retracted from the optical axis, and the light incident through the lens is incident to the imaging sensor. The imaging sensor converts the incident light into an electric signal to output the electric signal. The output electric signal is transmitted to a signal processing circuit to generate an image signal.

In the configuration disclosed in JP-A-2007-72304, because the mirror chamber is provided between the lens mount and the shutter device, it is difficult to reduce a thickness size in the optical axis direction of the camera body.

For the camera provided with the flash unit (light-emitter), it is necessary to dispose not only the flash unit but also a capacitor (electric storage device) that supplies electric power to the flash unit in the camera body, resulting in a problem in that the camera body is hardly miniaturized.

In consideration of the above problem, an imaging apparatus with a flash unit (light-emitter) capable of being miniaturized is provided.

SUMMARY

In one aspect, a mirrorless type imaging apparatus is provided. The imaging apparatus includes a mount to which a lens unit is mountable, an imager operable to produce an image signal from light incident through the lens unit, a light-emitter operable to emit light, and an electric storage device operable to supply electric power to the light-emitter, wherein the electric storage device is disposed behind the mount and below the imager.

According to, in the imaging apparatus of the aspect, the electric storage device is disposed below the imager, so that imaging apparatus can be miniaturized. Additionally, the electric storage device is disposed below the imager, so that an influence of heat generation of the imager on the electric storage device can be reduced.

BRIEF DESCRIPTION OF DRAWINGS

FIG. 3A is a front view of a digital camera according to an embodiment (the state in which the flash unit is placed below and inside the upper surface).

FIG. 3B is a front view of the digital camera of the embodiment (the state in which the flash unit is popped up from the upper surface).

FIG. 6A is a sectional view of the flash unit of the embodiment in a front-back direction (the state in which the flash unit is placed below and inside the upper surface).

FIG. 6B is a sectional view of the flash unit of the embodiment in the front-back direction (the state in which the flash unit is popped up from the upper surface).

DETAILED DESCRIPTION OF PREFERRED EMBODIMENT

1. Embodiment

1-1. Appearance

Figure 1A:
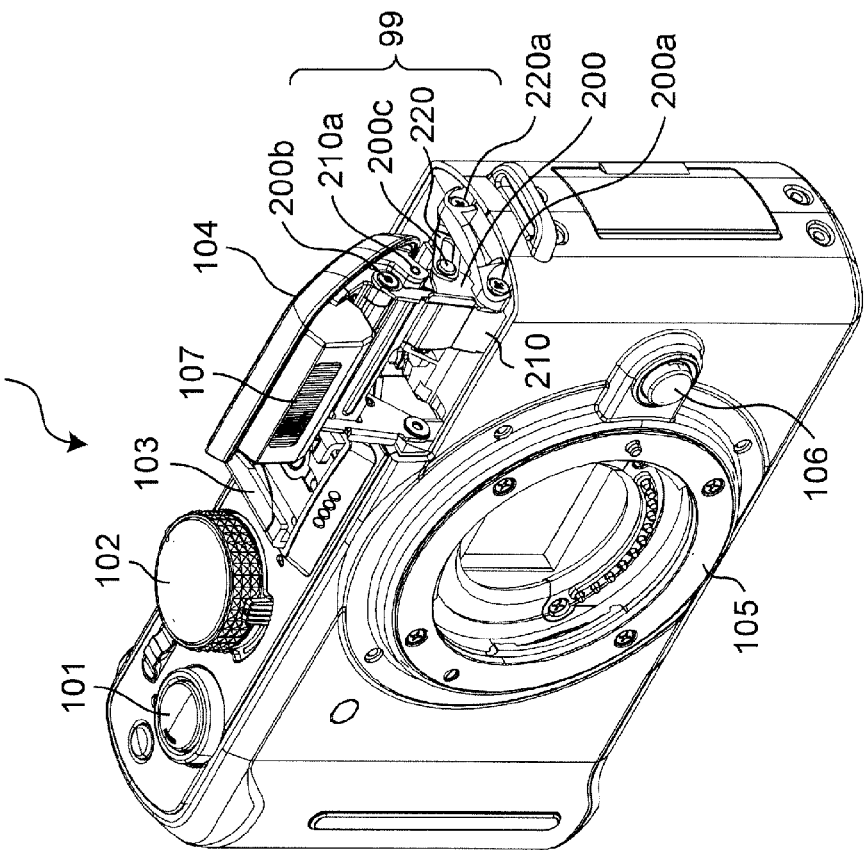
FIG. 1A is a perspective view of a digital camera according to an embodiment (a state in which a flash unit is placed below and inside an upper surface).
Figure 1B:
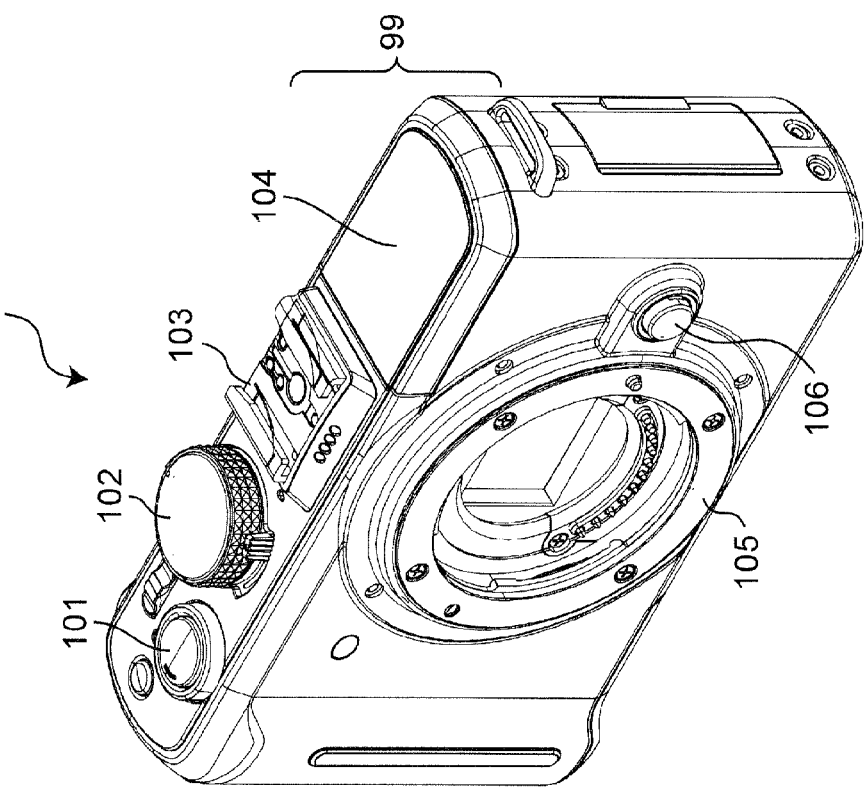
FIG. 1B is a perspective view of the digital camera of the embodiment (a state in which the flash unit is popped up from the upper surface).
Figure 2A:
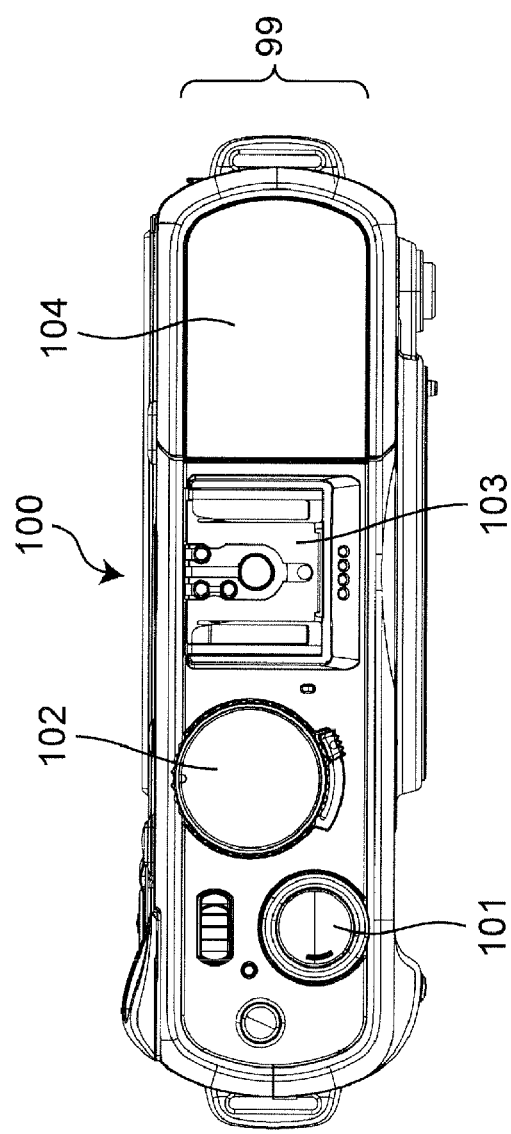
FIG. 2A is a top view of a digital camera according to an embodiment (the state in which the flash unit is placed below and inside the upper surface).
Figure 2B:
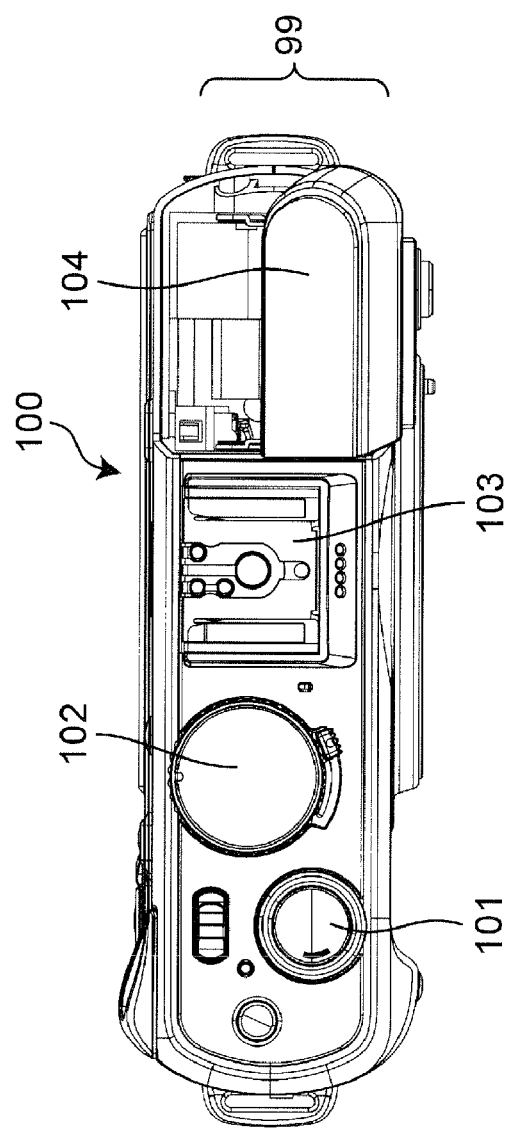
FIG. 2B is a top view of the digital camera of the embodiment (the state in which the flash unit is popped up from the upper surface).
Figure 4B:
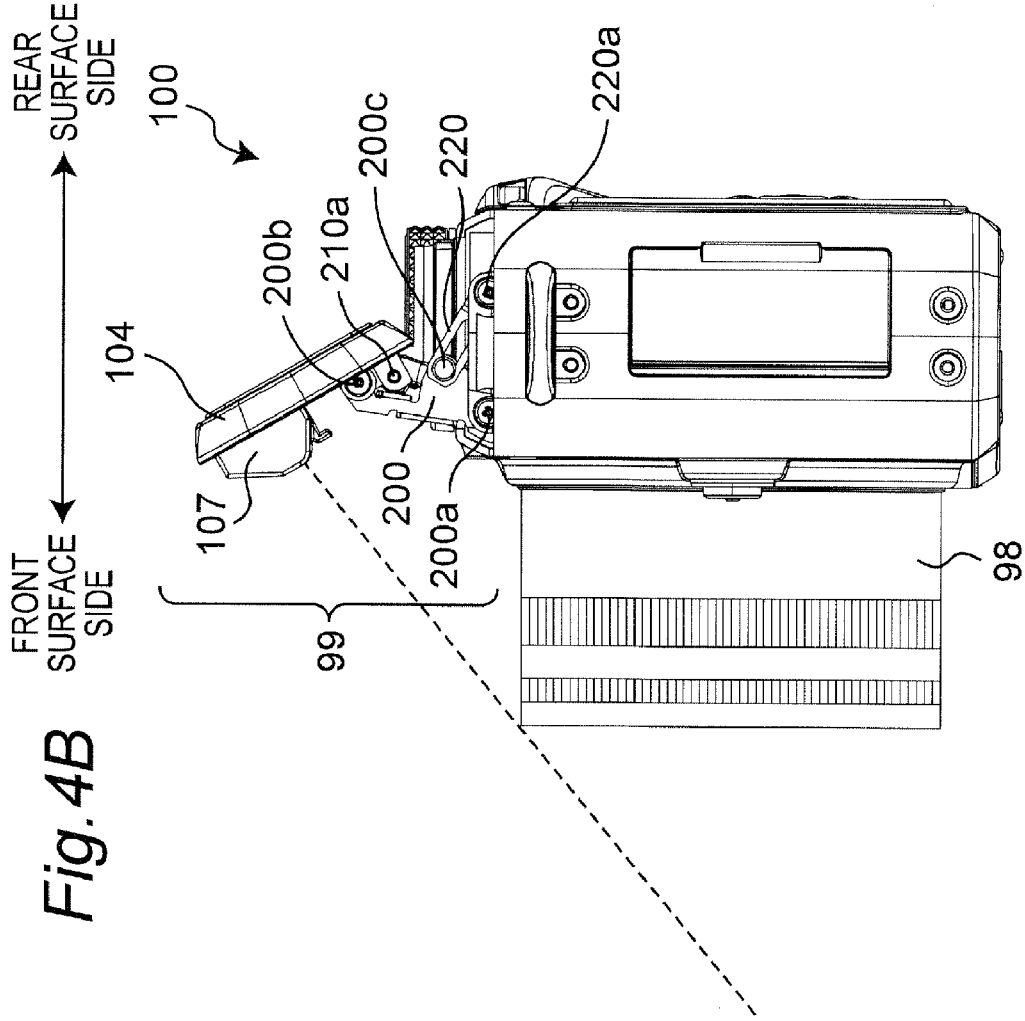
FIG. 4B is a side view of the digital camera of the embodiment (the state in which the flash unit is popped up from the upper surface).
Figure 4A:
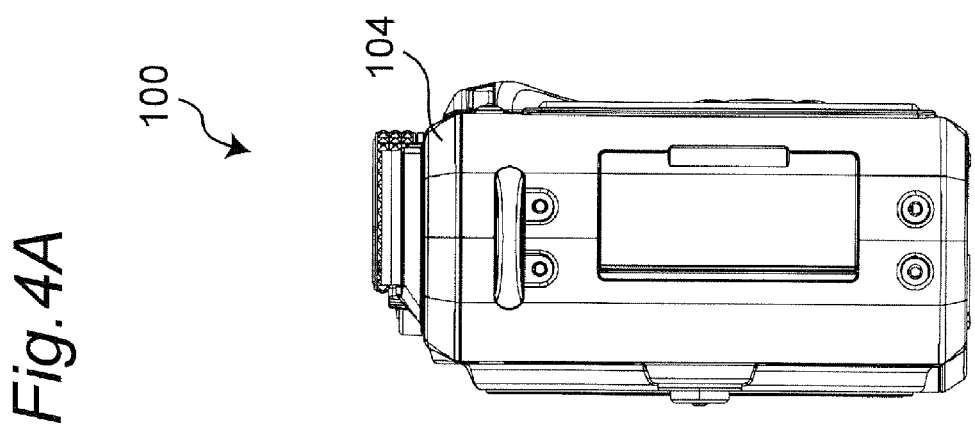
FIG. 4A is a side view of a digital camera according to an embodiment (the state in which the flash unit is placed below and inside the upper surface).

FIGS. 1A, 1B, 2A, 2B, 3A, 3B, 4A, and 4B are appearance views of a digital camera provided with a flash unit. FIGS. 1A and 1B are perspective views of the digital camera. FIGS. 2A and 2B are top views of the digital camera. FIGS. 3A and 3B are front views of the digital camera. FIGS. 4A and 4B are side views of the digital camera. In FIGS. 1A, 1B, 2A, 2B, 3A, 3B, 4A, and 4B and after-mentioned FIGS. 5, 6A and 6B, the same component is designated by the same numeral.

FIGS. 1A, 2A, 3A, and 4A show a closed state in which a flash unit 99 is placed below and inside an upper surface of the digital camera 100. FIGS. 1B, 2B, 3B, and 4B show an opened state in which the flash unit 99 is largely popped up upward and forward from the upper surface of the digital camera 100.

An appearance of the digital camera 100 will be described with reference to FIGS. 1A and 1B. In the upper surface of a chassis of the digital camera 100, in addition to the flash unit 99, the digital camera 100 includes various operation devices such as a release button 101, a mode dial 102, and a shoe 103 for attachment of an external device. The release button 101 receives an operation of a user to perform an autofocus operation or a record operation for recording taken image data. The mode dial 102 switches recording mode such as an aperture-priority mode, a shutter speed-priority mode, and a manual mode. The shoe 103 is provided to connect an external flash device or an external viewfinder to the digital camera 100, connecting the digital camera 100 electrically and mechanically to the external device.

The flash unit 99 includes a flash unit cover 104, a flash device 107, a first link lever 200, a second link lever 220, and a driving lever 210. The detailed configuration of the flash unit 99 is described later. In the closed state, the flash unit 99 is placed in a flash unit storage box 300 (see FIGS. 6A and 6B) that is located below and inside the upper surface of the digital camera 100. In the state in which the flash unit 99 is placed inside the digital camera 100, only the flash unit cover 104 is exposed to the outside. The flash unit cover 104 occupies a whole area of the upper surface of one shoulder portion of the digital camera 100, and the depth of the cover 104 is equal to that of the digital camera 100. Therefore, the flash unit 99 is enlarged so far as the depth of the digital camera 100 permits, so that the flash device 107 can be raised as higher as possible.

A lens mount 105 and a lens detaching button 106 are provided in the front surface of the digital camera 100. The lens 98 (see FIG. 4B) can be mounted on the digital camera 100 with the lens mount 105 interposed therebetween. Various lenses can be used. The lens 98 mounted on the digital camera 100 can be detached by pressing down the lens detaching button 106.

In the opened state, the flash unit 99 is largely popped up upward and forward from the upper surface of the digital camera 100. Therefore, the flash unit 99 can avoid eclipse of the flash light caused by the existence of the lens 98 when the flash device 107 emits the flash light.

1-2. Configuration of Flash Unit

Figure 5:
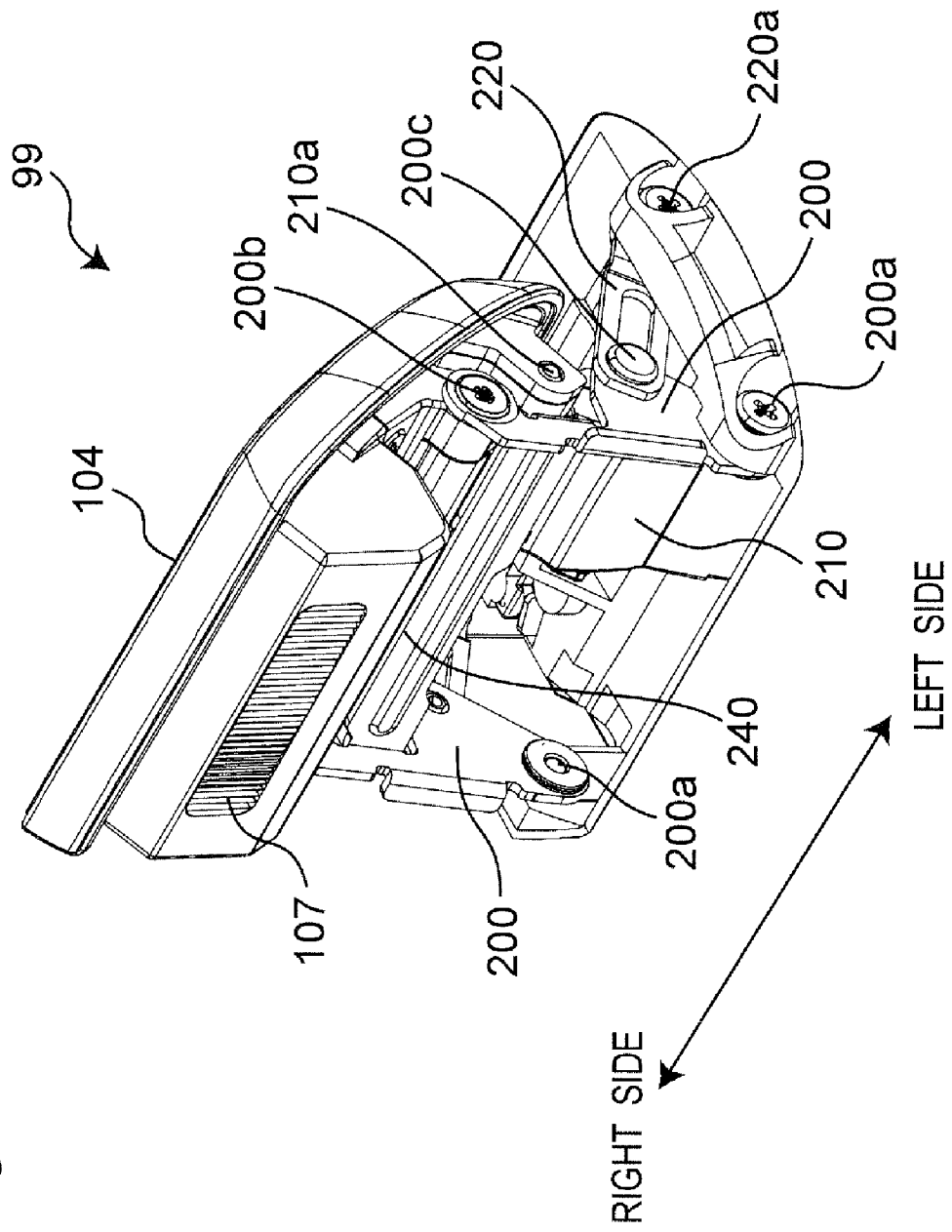
FIG. 5 is a perspective view of the flash unit of the embodiment.

FIG. 5 is a perspective view of the flash unit 99. FIGS. 6A and 6B show a section in a front-back direction of the flash unit 99. FIG. 6A shows the closed state in which the flash unit 99 is placed below and inside the upper surface of the digital camera 100. FIG. 6B shows the opened state in which the flash unit 99 is largely popped up upward and forward from the upper surface of the digital camera 100.

As shown in FIGS. 1B, 4B, 5, and 6B, the flash unit 99 includes the flash unit cover 104, the flash device 107, the first link lever 200, the second link lever 220, and a driving lever 210. As shown in FIG. 6B, the flash unit 99 also includes the flash unit storage box 300, a raise up button 600, a latching portion 610, and a latched portion 620.

Hereinafter, as shown in FIGS. 6A and 6B, a side to which a light-emitting surface 107a of the flash device 107 points in a state in which the flash unit 99 is popped up is referred to as "a front surface side" of the flash unit 99, and an opposite side to the front surface side is referred to as "a rear surface side" of the flash unit 99. As shown in FIG. 5, a observer's right side of the flash device 107 in a state to which the flash device 107 points to the front side is referred to as "a right side" of the flash unit 99, and an opposite side to the right side is referred to as "a left side" of the flash unit 99.

Hereinafter, a structure of the flash unit 99 or the like will specifically be described with reference to FIGS. 6A and 6B. The flash unit cover 104 includes the flash device 107 that emits the flash light. The flash device 107 is located near the front surface side of the digital camera 100 in the front-back direction when the flash unit 99 is in the closed state. The flash device 107 is not exposed to the outside of the digital camera 100 when the flash device 107 is placed in the flash unit storage box 300. The flash device 107 includes a xenon tube as a flash element, a reflector shade as a reflector plate, a reflector shade support frame, and a Fresnel lens. The flash unit 99 is connected to a flash circuit that includes a capacitor, a booster circuit, and a light emission trigger circuit. The flash circuit is provided in the digital camera 100. The flash circuit controls a flashing operation of the flash device 107 according to a control signal transmitted from a controller that wholly controls the operation of each unit of the digital camera 100.

The flash device 107 includes the latched portion 620. In the closed state of the flash unit 99, the latched portion 620 is latched in the latching portion 610 included in the flash unit storage box 300 (Note: the state in which the latched portion 620 is latched is not shown in FIG. 6A). The raise up button 600 interlocks with the operation of the latching portion 610. The latching state between the latched portion 620 and the latching portion 610 is released by pressing down the raise up button 600.

The driving lever 210 links (connects) the flash unit cover 104 and the flash unit storage box 300 with each other. In the closed state of the flash unit 99, the driving lever 210 is, at its one end, turnably supported near the rear surface side of the flash unit 99 by a pin 210a. The driving lever 210 is, at its other end, turnably supported near a lower portion of the front surface side of the flash unit storage box 300 by a pin 210b. The driving lever 210 is biased in a pop-up direction (counterclockwise about the pin 210b in FIG. 6B) by a torsion spring 210c that exists near the pin 210b. In other words, when the raise up button 600 is pressed down in the closed state of the flash unit 99, the latching state between the latched portion 620 and the latching portion 610 is released, so that the driving lever 210 is popped up by a biasing force of the torsion spring 210c (the driving lever 210 turns counterclockwise about the pin 210b to substantially raise up).

The flash unit cover 104 is biased in a direction in which the flash device 107 is raised upward (clockwise about the pin 210a in FIG. 6B) by a torsion spring 210d that exists near the pin 210a. In other words, when the driving lever 210 is popped up (when the driving lever 210 turns clockwise about the pin 210b in FIG. 6B), the flash unit cover 104 raises up such that the flash device 107 is located upward as shown in FIG. 6B (the flash unit cover 104 turns clockwise about the pin 210a to substantially raise up). At this point, the flash unit cover 104 orients a light-emitting surface 107a of the flash device 107 that is not exposed to the outside in the closed state toward the front surface, and the whole of the flash unit cover 104 is projected upward from the flash unit storage box 300. Therefore, the use position of the flash unit 99 can be raised by a raised up amount of the flash unit cover 104 (corresponding to the depth of the flash unit cover 104) plus the pop-up height of the driving lever 210 (corresponding to a length of the driving lever 210).

The first link lever 200 links the flash unit cover 104 and the flash unit storage box 300 with each other. The first link lever 200 is, at its one end, turnably supported near the upper portion of the front surface side of the flash unit storage box 300 by a pin 200a. The first link lever 200 is, at its other end, turnably supported near the rear surface side of the flash unit cover 104 by a pin 200b. The first link lever 200 includes a stopping pin 200c near the center in a longitudinal direction. Although the first link lever 200 that is provided on the left side of the flash unit 99 is described above, a link lever having a configuration similar to that of the first link lever 200 is also provided on the right side of the flash unit 99.

A position of a connection portion of the first link lever 200 and the flash unit cover 104 (a position of the pin 200a) differs from a position of a connection portion of the driving lever 210 and the flash unit cover 104 (a position of the pin 210a) (see FIG. 6B). The cover 104 is supported by two points, that is, the first link lever 200 and driving lever 210. As is clear from FIG. 6B, a position of a connection portion of the first link lever 200 and the flash unit storage box 300 (a position of the pin 200b) differs from a position of a connection portion of the driving lever 210 and the flash unit storage box 300 (a position of the pin 210b). In this manner because the flash unit cover 104 is supported by the first link lever 200 and the driving lever 210, and thus the flash unit cover 104 and the flash device 107 are stably raised with a constant trace by the levers 200 and 210. Because the flash unit cover 104 is supported by the two points as described above, when the flash unit cover 104 is pushed from above with a finger or the like to return the flash unit 99 to a storage position, the flash unit cover 104 can smoothly be pressed down with a constant trace without instability of trace of pop-up.

The second link lever 220 links (connects) the first link lever 200 and the flash unit storage box 300 each other. The second link lever 220 is, at its one end, turnably supported near the upper surface of the rear surface side of the flash unit storage box 300 by a pin 220a. The second link lever 220 has at the other end side a long hole 220b that extends in the longitudinal direction. A stopping pin 200c of the first link lever 200 is fitted in the long hole 220b of the second link lever 220 to be movable in the long hole 220b. When the stopping pin 200c moves to pin 220a in the long hole 220b, the first link lever 200 and the second link lever 220 turn clockwise about the pin 200a and the pin 210b to change from the raised up state to the lying state, and the flash device 107 is placed in the flash unit storage box 300. On the other hand, when the stopping pin 200c moves onto the front surface side in the long hole 220b, the stopping pin 200c contacts an end portion of the long hole 220b to prevent the first link lever 210 from moving due to the biasing force in the pop-up direction of the torsion spring 210c by an amount equal to or greater than a predetermined amount, in the raised up direction of the first link lever 200. Particularly the second link lever 220 stops the movement at the position at which the first link lever 200 is substantially in the raised up state. At this point, the position of the flash unit cover 104 is retained as the use position. Thus, compared with the storage state, the height of the use position of the flash device 107 can substantially increase by total amount of length of the first link lever 200 and depth of the flash unit cover 104.

As the driving lever 210 is popped up by the biasing force, the second link lever 220 is oriented obliquely upward from the flash unit storage box 300 about the rotation axis of the pin 220a. In other words, the long hole 220b of the second link lever 220 is also oriented obliquely upward. The stopping pin 200c moves obliquely upward in the long hole 220b that is oriented obliquely upward, and thus the whole of the flash unit cover 104 is largely brought up upward and forward. Although the second link lever 220 that is provided on the left side of the flash unit 99 is described above, a link lever having a configuration similar to that of the second link lever 220 is also provided on the right side of the flash unit 99.

The first link levers 200 on the right and left of the flash unit 99 are coupled by a reinforcement bridge 240. Thus, the first link lever 200 can be reinforced so as to withstand the pop-up of the flash unit 99. Therefore the pop-up operation of the flash unit 99 can stably be performed.

According to the flash unit 99 of the first embodiment, the flash unit that can largely be popped up upward and forward with respect to the digital camera 100 while compactly stored in the chassis of the digital camera 100 can be implemented. That is the end portion on the rear surface side of the flash unit cover 104 is more largely brought up forward by the mechanism including the first link lever 200, the second link lever 22, and the driving lever 210, compared to the closed state. Therefore, the flash device 107 is largely brought up not only in the height direction but also in the forward direction. Accordingly, the flash unit capable of that avoiding the eclipse caused by the existence of the lens 98 even though being incorporated in the digital camera 100 can be provided.

In the flash unit 99 of the first embodiment, the flash unit cover 104 is configured to occupy the whole area of the upper surface of one shoulders of the digital camera 100. Therefore, the flash device 107 can be enlarged, and the use position of the flash device 107 can be raised by the amount corresponding to the depth of the flash unit cover 104, that is, the amount corresponding to the depth of the digital camera 100, when the flash unit 99 is popped up. Because the flash unit cover 104 is set so as to lean forward when the flash unit cover 104 is projected upward, the light-emitting surface 107a of the flash device 107 can also be projected from the front surface (a surface on which the lens 98 is mounted) of the digital camera 100.

The first link lever 200 is, at its one end, turnably connected to the front portion of the flash unit storage box 300, at its other end, is turnably connected to the rear portion of the flash unit cover 104, and the flash device 107 is attached to the rear surface of the flash unit cover 104. Therefore, as shown in FIG. 6B, the flash device 107 can be located at the high position on the front surface side of the digital camera 100 as much as possible when the flash unit 99 is popped up. Since the flash device 107 is attached near the front end portion in the rear surface of the flash unit cover 104, the flash device 107 can be located at the higher position.

When the flash device 107 is not used, because the first link lever 200 is almost placed in the lying state and placed in the flash unit storage box 300, so that the flash unit 99 can compactly be configured.

The driving lever 210 has a cylindrical structure, and electric wiring 250 to connect the side of the flash unit storage box 300 and the flash device 107 with each other is passed through an internal space of the driving lever 210. Accordingly, with this arrangement, when the flash unit 99 is popped up, the driving lever 210 can well protect the electric wiring 250 such that the electric wiring 250 does not interfere with the first link lever 200 or the second link lever 220.

In the embodiment, the driving lever 210 is popped up by the biasing force of the torsion spring 210c. Alternatively, the first link lever 200 may be popped up by the biasing force.

1-3. Internal Configuration of Digital Camera

An electric power for making the flash unit (light-emitter) 107 to emit the light is supplied through the electric wiring (cable) 250 from a capacitor incorporated in a lower portion of the digital camera 100.

Figure 7:
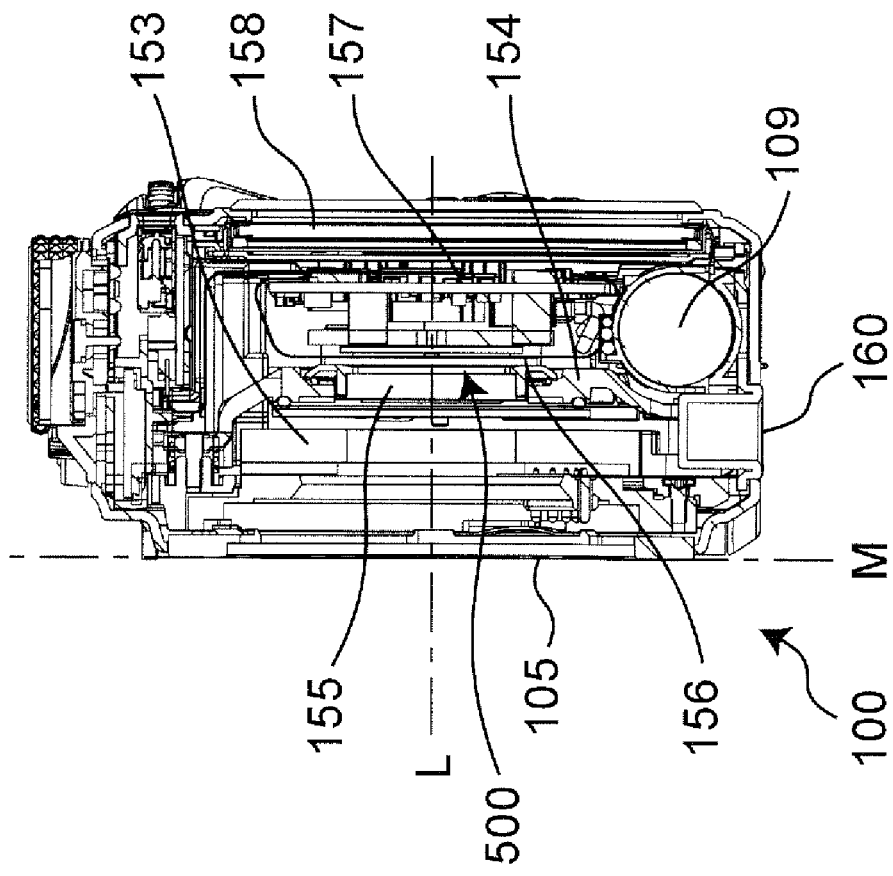
FIG. 7 is a sectional view of the digital camera of the embodiment in the front-back direction.

FIG. 7 is a sectional view of the digital camera of the embodiment cut along the depth direction. A straight line L indicates an optical axis, and a straight line M indicates a mount surface.

The digital camera 100 of the embodiment is not the so-called single-lens reflex type, and does not include an optical viewfinder. Therefore, the digital camera 100 does not include a mirror chamber including the movable mirror that switches whether the incident light reaches at the optical viewfinder or the imaging element. The digital camera 100 includes neither a pentaprism nor a pentamirror that guides the incident light reflected on the movable mirror to an eyepiece lens of the optical viewfinder. In the digital camera 100, the image generated by the imaging element 156 is displayed on a liquid crystal monitor 158 provided in a back surface. With this arrangement, the user can visually recognize a subject image on the liquid crystal monitor 158 to determine a composition. In the single-lens reflex type digital camera, an electronic viewfinder which displays the image generated by the imaging element 156 may be provided at the position at which the optical viewfinder is disposed.

Thus, the digital camera 100 is a so-called mirrorless type imaging apparatus that does not include components such as the mirror chamber that is provided in the single-lens reflex type digital camera. Therefore, a low profile digital camera 100 can be realized particularly in a direction of an optical axis L. On the other hand, many components are densely disposed in the digital camera 100. A shutter 153, an ultrasonic filter 154, an optical low-pass filter 155, the imaging element 156, and a main board 157 are disposed along the optical axis L from the side of the mount 105. Further, the liquid crystal monitor 158 is disposed in the back surface of the digital camera 100. Furthermore, a tripod hole 160 that receives a screw provided in a tripod when the digital camera 100 is fixed to the tripod is made in a lower portion of the digital camera 100.

The mount 105 is mechanically and electrically coupled to a mount provided on a lens 98. The mount 105 fixes the lens 98 to the digital camera 100. The mount 105 realizes the supply of the electric power from the digital camera 100 to the lens 98 and communication between the lens 98 and the digital camera 100. The ultrasonic filter 154 includes a vibration film and a piezoelectric element that drives the vibration film. A voltage having a specific frequency is applied to the piezoelectric element to vibrate the vibration film. Therefore, the ultrasonic filter 154 can remove dust that adheres to the vibration film. The optical low-pass filter 155 is a filer for cutting the incident light having a spatial frequency exceeding resolution of the imaging element 156. A solid-state imaging element such as a CCD sensor and a CMOS sensor is used as the imaging element 156. Alternatively, a solid-state imaging element except the CCD sensor and CMOS sensor may be used as the imaging element 156. An infrared cutoff filter is disposed in a front surface of the imaging element 156. Frequently the ultrasonic filter 154, the optical low-pass filter 155, and the imaging element 156 are integrally formed as an imaging element unit 500.

A capacitor 109 that supplies the electric power to the flash device 107 of the flash unit 99 through the electric wiring 250 is disposed in the lower portion of the digital camera 100. The capacitor 109 is disposed behind the mount 105 and below the imaging element unit 500 including the ultrasonic filter 154, the optical low-pass filter 155, and the imaging element 156. Therefore, the digital camera 100 can be miniaturized. The imaging element unit 500 generates relatively large heat in the components constituting the digital camera 100. The heat generated in the imaging element unit 500 transfers upward. In the embodiment, the capacitor 109 is disposed below the imaging element unit 500, so that influence of the heat generation of the imaging element unit 500 on the capacitor 109 can be reduced.

The capacitor 109 has a cylindrical shape, and a central axis of the capacitor 109 is substantially parallel to a width direction (length direction of the upper surface of the digital camera 100) of the digital camera 100. The capacitor 109 as the electric storage device is an electrolytic capacitor. Alternatively, the capacitor 109 may be other type capacitors such as an electric double layer capacitor. Further, the electric storage device may be a component other than the capacitor.

The mount 105 needs to have a predetermined diameter in order to attach the lens 98. On the other hand, the imaging element 156 is standardized for a 35 mm full size, APS-C size, and a 4/3 size, and the like. The height of the imaging element 156 does not exceed the diameter of the mount 105. Accordingly, a space is made behind the mount 105 and below the imaging element unit 500 including the ultrasonic filter 154, the optical low-pass filter 155, and the imaging element 156. Disposing the cylindrical capacitor 109 in the space allows the digital camera 100 to be compactly formed. Usually the width of an imaging surface of the imaging element 156 is larger than its height. Therefore, behind the mount 105, the horizontal space made right and left of the imaging element 156 tends to be smaller than the lower space made below the imaging element 156. Further, as described later, many components are disposed on the right and left of the imaging element unit 500. Accordingly, arrangement of the capacitor 109 behind the mount 105 and below the imaging element 156, largely contributes to the miniaturization of the digital camera 100.

For the same reason, a space is made behind the mount 105 and above the imaging element unit 500 including the ultrasonic filter 154, the optical low-pass filter 155, and the imaging element 156.

Figure 8:
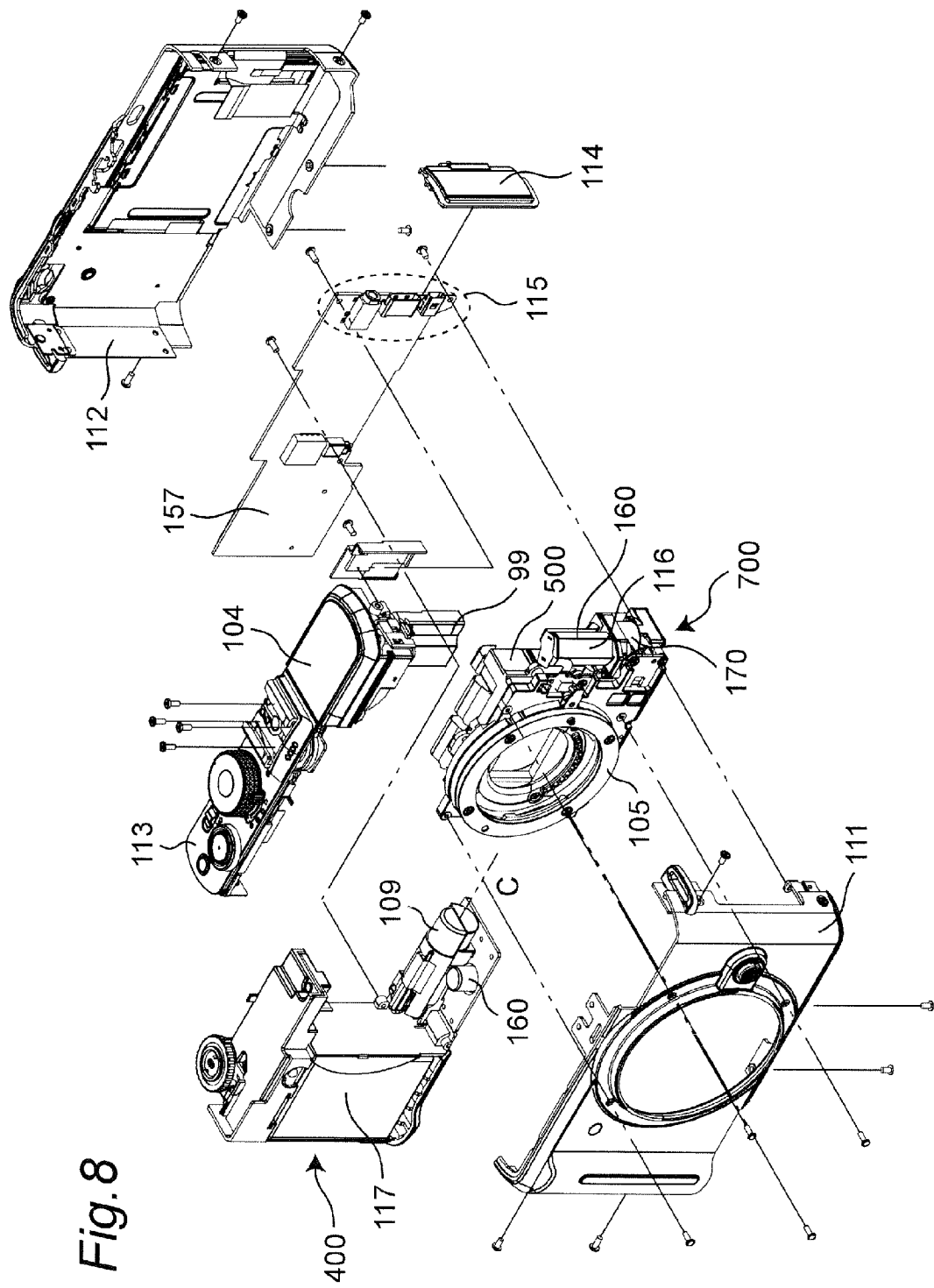
FIG. 8 is an exploded perspective view of the digital camera of the embodiment.

FIG. 8 is an exploded perspective view of the digital camera according to the embodiment. In the configuration of the digital camera 100, an optical unit 700, a battery unit 400, and a main board 157 are encased with a front case 111 and a rear case 112. The upper surface of the digital camera 100 is covered with a top case 113.

The optical unit 700 includes the mount 105, the shutter 153, and the imaging element unit 500. As described above, the imaging element unit 500 includes the ultrasonic filter 154, the optical low-pass filter 155, and the imaging element 156. A shutter driving unit 116 that drives the shutter 153 is disposed on the left of the imaging element 156.

The shutter driving unit 116 includes a motor 160 that generates a driving force and a power transmission mechanism 170 that transmits the driving force generated by the motor 160 to a front curtain and a rear curtain of the shutter 153. The shutter driving unit 116 occupies a large space on the left of the imaging element unit 500.

The battery unit 400 mainly includes a battery case 117, the capacitor 109, and the tripod hole 160. The battery case 117 can store a recording medium such as a memory card in addition to the battery. Thus, the right space of the battery unit 400 is substantially occupied by the battery case 117.

An LSI that controls each section of the digital camera 100, an LSI that performs various pieces of image processing, and an IC that controls the electric power supplied from the battery are mounted on the main board 157. Terminal 115 to connect the digital camera 100 with various external devices are mounted on the left of the main board 157. Examples of the terminals 115 include a USB terminal that is used to transfer image data to a personal computer, an HDMI terminal that is used to display the image on a large-size television screen, and an AV-OUT terminal. The terminals 115 are covered with a terminal cover 114.

The flash unit 99 as detailed before attached to the left of the top case 113. The flash unit 99 including the driving mechanism thereof has a shape extending toward the lower portion of the digital camera 100.

As described above, in the digital camera 100, the space on the left of the imaging element unit 500 is occupied by the shutter driving unit 116, the terminals 115, and the extending portion 99a of the flash unit 99. On the other hand, the space on the right of the imaging element unit 500 is occupied by the battery case 117. Even in the situation, according to the embodiment, the capacitor 109 is provided behind the mount 105 and below the imaging element 156, so that the capacitor 109 can be disposed without influencing the layout of the shutter driving unit 116 and flash unit 99. In this manner, the miniaturization of the digital camera 100 can be realized by disposing the capacitor 109 below the imaging element 156.

The imaging element unit 500 generates the relatively large heat among the components constituting the digital camera 100. The heat generated in the imaging element unit 500 transfers upward. In the embodiment, the capacitor 109 is disposed below the imaging element unit 500, so that influence of the heat generation of the imaging element unit 500 on the capacitor 109 can be reduced.

INDUSTRIAL APPLICABILITY

The present embodiment can miniaturize the imaging apparatus, and thus can widely and usefully be applied to imaging apparatuses such as the digital camera.

What is claimed is:

1. A mirrorless type imaging apparatus to which a lens unit is attachable, the imaging apparatus comprising:
    a mount to which the lens unit is mountable;
    an imager operable to generate an image signal from light incident through the lens unit;
    a light-emitter operable to emit light; and
    a cylindrical capacitor operable to supply electric power to the light-emitter,
    wherein the cylindrical capacitor is disposed behind the mount and below the imager.

2. The imaging apparatus according to claim 1, wherein the imager includes an optical low-pass filter.

3. The imaging apparatus according to claim 1, wherein the imager includes an infrared cutoff filter.

4. The imaging apparatus according to claim 1, wherein the imager includes a dust remover.

5. The imaging apparatus according to claim 1, wherein the cylindrical capacitor is disposed with a central axis of the cylindrical capacitor being substantially parallel to a width direction of the imaging apparatus.

6. The imaging apparatus according to claim 1, wherein the light-emitter is a pop-up type flash unit that can pop up from a body of the imaging apparatus.

* * * * *